United States Patent
Hieb et al.

(10) Patent No.: US 11,816,472 B2
(45) Date of Patent: *Nov. 14, 2023

(54) UNMANNED AERIAL VEHICLE UPDATER

(71) Applicant: DISH Network L.L.C., Englewood, CO (US)

(72) Inventors: Eric Ray Hieb, Parker, CO (US); Christopher William Bruhn, Aurora, CO (US); Matthew Polson, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/670,038

(22) Filed: Feb. 11, 2022

(65) Prior Publication Data

US 2022/0164179 A1 May 26, 2022

Related U.S. Application Data

(63) Continuation of application No. 16/854,338, filed on Apr. 21, 2020, now Pat. No. 11,281,449.

(51) Int. Cl.
| | |
|---|---|
| G06F 8/65 | (2018.01) |
| G07C 5/00 | (2006.01) |
| H04W 4/00 | (2018.01) |
| H04W 4/40 | (2018.01) |
| B64C 39/02 | (2023.01) |
| B64U 101/30 | (2023.01) |

(52) U.S. Cl.
CPC .............. *G06F 8/65* (2013.01); *B64C 39/024* (2013.01); *G07C 5/008* (2013.01); *H04W 4/00* (2013.01); *H04W 4/40* (2018.02); *B64U 2101/30* (2023.01)

(58) Field of Classification Search
CPC ........................................................ G06F 8/65
See application file for complete search history.

(56) References Cited

U.S. PATENT DOCUMENTS

| | | | | |
|---|---|---|---|---|
| 10,162,348 | B1 * | 12/2018 | Scott | B64C 37/00 |
| 10,839,336 | B2 * | 11/2020 | Greiner | B64D 1/02 |
| 2015/0341540 | A1 * | 11/2015 | Kim | G05D 1/0094 |
| | | | | 348/144 |
| 2016/0292403 | A1 * | 10/2016 | Gong | G08G 5/006 |

* cited by examiner

*Primary Examiner* — Jae U Jeon
(74) *Attorney, Agent, or Firm* — KILPATRICK TOWNSEND & STOCKTON, LLP

(57) ABSTRACT

Various arrangements for communicating with a device utilizing an unmanned aerial vehicle (UAV) are presented. A backend system may detect a triggering event associated with a device based upon data received via a first connection. In response to detecting the first triggering event, the UAV may receive a first data set and a location associated with the device from the backend system. The UAV may deploy to the received location. A second connection between the UAV and the device can be established at the received location. The UAV may transmit the first data set to the device via the second connection at the received location.

20 Claims, 5 Drawing Sheets

UNMANNED AERIAL VEHICLE UPDATER

CROSS-REFERENCES TO RELATED APPLICATIONS

This application is a continuation of U.S. patent application Ser. No. 16/854,338, filed on Apr. 21, 2020, entitled "Unmanned Aerial Vehicle Updater," the disclosure of which is hereby incorporated by reference in its entirety for all purposes.

BACKGROUND

Communication networks comprise many different devices communicating with each other. In order for a network to be effective, a certain amount of transaction speed is required for certain device-to-device communications. If the bandwidth associated with one or more devices within the network falls below a certain threshold, the network's performance may be compromised. For example, low bandwidth may cause a bottleneck within the network when transmitting larger data sets. Thus, there is a need to provide external solutions to effectively amplify the bandwidth within a network, especially for the transmission of larger data sets.

SUMMARY

Various embodiments are described related to a method for updating a device utilizing an unmanned aerial vehicle (UAV). The method may comprise detecting, by a backend system, a first triggering event associated with the device based upon data received by the backend system from the device via a first connection. The method may comprise, in response to detecting the first triggering event, transmitting, by the backend system to the UAV, a first data set and a location associated with the device. The method may comprise deploying the UAV to the received location. The method may comprise establishing, by the UAV, a second connection with the device at the received location. The second connection may be different than the first connection. The method may comprise transmitting, by the UAV, the first data set to the device via the second connection at the received location. The method may comprise receiving, by the UAV, at the received location, status information associated with the device from the device via the second connection after the first data set may be transmitted to the device.

Embodiments of such a method may include one or more of the following features: the first triggering event may comprise of a bandwidth associated with the device falling below a predetermined threshold associated with the first connection. The device may be a second UAV. The first connection may comprise a Low Power Wide Area Network (LPWAN) or Low Power Wireless Personal Area Network (LPPAN). The second connection may comprise a Bluetooth-based connection or a Near Field Communication (NFC) connection. The method may further comprise receiving, by the backend system, diagnostic information associated with the device. Receiving the diagnostic information may comprise capturing, via an imaging device on the UAV, an image the device. The method may comprise transmitting, by the UAV, the image of the device to the backend system. Receiving status information associated with the device may further comprise causing, by the UAV, the device to perform a self-diagnosis to generate a first result. The method may comprise transmitting, by the UAV to the backend system, the first result via a third connection. The third connection may be different from the first connection and the second connection. The first triggering event may comprise a firmware version of the device being out of date. The method may further comprise accessing, by the backend system, a device database that maintains an indication of a current firmware version of a plurality of devices. The plurality of devices may comprise the device. Accessing the device database may result in the firmware version of the device being determined to be out of date.

In some embodiments, a system for updating a device is described. The system may comprise a backend system that may be in communication with an unmanned aerial vehicle (UAV). The system may be configured to detect a first triggering event associated with the device based upon data received by the backend system from the device via a first connection. The system may be configured to, in response to detecting the first triggering event, transmit, to the UAV, a first data set and a location associated with the device from the backend system. The system may comprise the UAV configured to receive a first data set and the location associated with the device from the backend system. The UAV may be configured to deploy to the received location. The UAV may be configured to establish a second connection with the device at the received location. The second connection may be different than the first connection. The UAV may be configured to transmit the first data set to the device via the second connection at the received location. The UAV may be configured to receive at the received location, status information associated with the device from the device via the second connection after the first data set may be transmitted to the device.

Embodiments of such a method may include one or more of the following features: the first triggering event may be comprised of a bandwidth associated with the device falling below a predetermined threshold associated with the first connection. The device may be a second UAV. The first connection may comprise a Low Power Wide Area Network (LPWAN) or Low Power Wireless Personal Area Network (LPPAN). The second connection may comprise a Bluetooth-based connection or a Near Field Communication (NFC) connection. The backend system may be further configured to receive diagnostic information provided by the device. The backend system may be further configured to receive diagnostic information provided by the device. The UAV may be further configured to capture, using an imaging device of the UAV, an image the device. The UAV may be further configured to transmit the image of the device to the backend system. The UAV may be configured to cause the device to perform a self-diagnosis to generate a first result. The UAV may be configured to transmit, to the backend system, the first result via a third connection. The third connection may be different from the first connection and the second connection. The first triggering event may comprise a firmware version of the device being determined to be out of date. The system may further comprise a device database that may maintain an indication of a current firmware version of a plurality of devices. The plurality of devices may comprise the device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
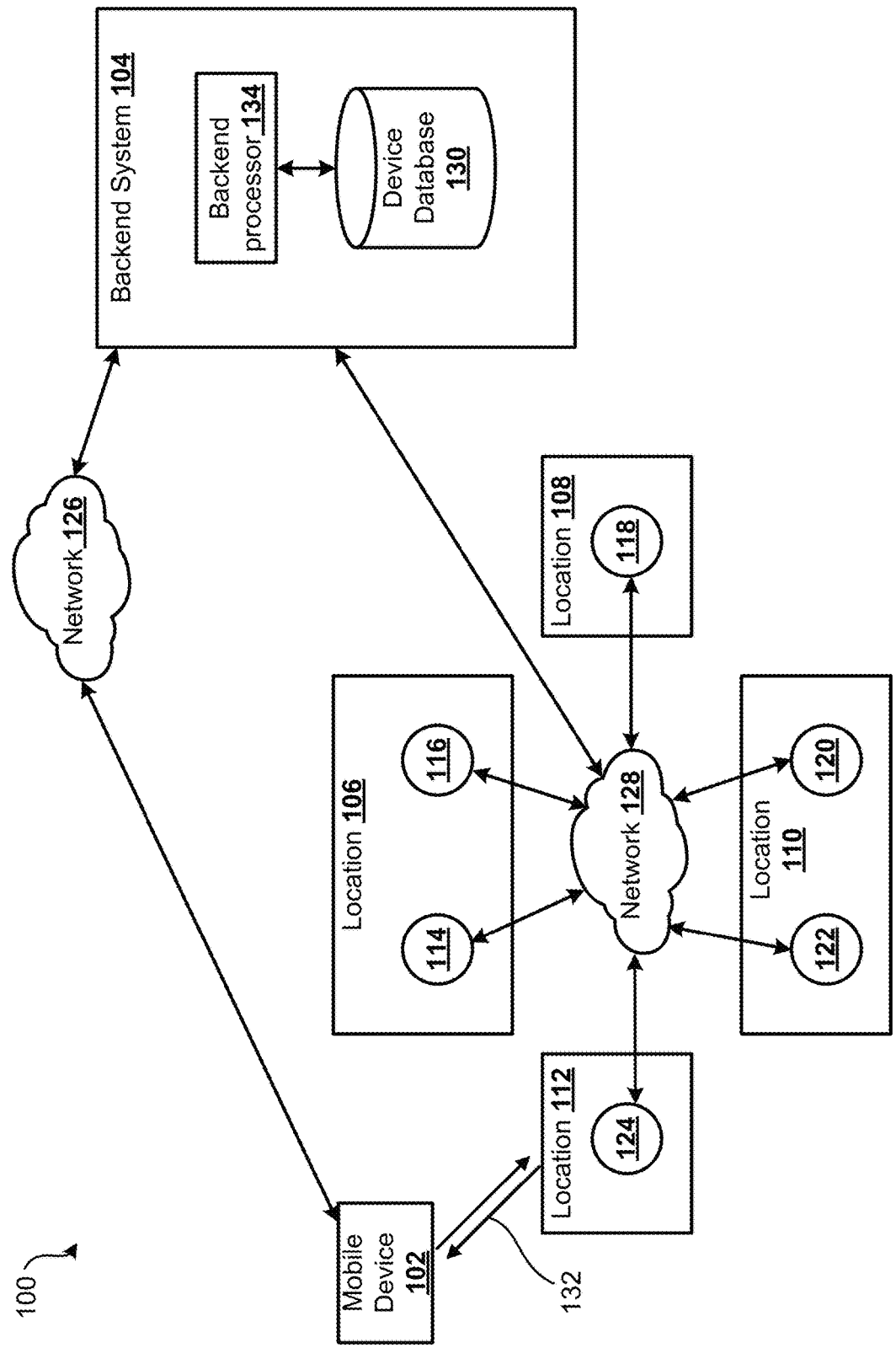
FIG. 1 illustrates an example of a computer network in accordance with one or more embodiments described herein.

Embodiments described herein generally relate to providing an alternate data path for devices within a network. More specifically, embodiments described herein disclose an unmanned aerial vehicle (UAV), such as a drone or, more generally, some other form of autonomous device, providing critical data packets, such as software updates, to devices within a network. The devices may communicate to a backend system via a network. The network may have limited bandwidth capabilities and may be, for example, a Narrow Band Internet of Things (NBIoT) network. The devices may send status information associated with devices to the backend system over the network. The status information may indicate one or more of a current firmware version of the device, errors associated with the device, an update request from the device (e.g., a request to receive a data package), current bandwidth information (e.g., upload speed, download speed) associated with the device, or may include other information associated with the device. The backend system, based on the received status information, may determine that a triggering event has occurred. The triggering event may be, for example, an out of date firmware version identifier, a certain error associated with the device, or that the device requires a data package that, based upon the bandwidth information associated with the device, would be impractical for transmitting over the network.

Once a triggering event has been determined, the backend system may push a data package and global positioning system (GPS) (or other location information) associated with the device to the UAV. The UAV may then autonomously, and/or via instructions from a remote pilot, fly to the device based on the location information. Once within a certain proximity of the device, the UAV may establish a short-range connection, such as Bluetooth or physical connection via a magnetic cord, with the device to deliver the data package.

The device may transmit a response to the UAV upon receiving the data package. The response may vary depending upon the type of data package received. In the case of a firmware update, for example, the response may indicate that the device has successfully received and applied the firmware update or that the firmware update has failed. The response could also include diagnostic information When within proximity of the device, the UAV may also gather diagnostic information for the device or perform diagnostics on the device. For example, an integrated camera of the UAV may be utilized to capture one or more images of the device to identify physical damage to the device (e.g., damage to a solar panel associated with the device). In another example, the UAV may, via the short-range connection, cause the device to run one or more self-diagnosis tests and transmit the results to the UAV. In such an example, the UAV may then transmit the results of the self-diagnosis test to the backend system or may perform one or more resolution actions based on the results of the self-diagnosis test.

One or more issues with the device may be determined based on the diagnostic information. In response to the one or more issues, one or more resolution actions may be performed. For example, the UAV may capture one or more images of the device and determine, via image processing, that there is a crack in a solar panel associated with the device and that the solar panel needs to be replaced (e.g., a resolution action). In one embodiment, the backend system may determine one or more issues associated with the device. For example, the UAV may receive self-diagnosis test results from the device and transmit those results to the backend system. The backend system may then query a device database to determine if the self-diagnosis test indicates one or more resolution actions should be taken, such as restarting the device or replacing the device (or one or more parts of the device). After diagnostic information has been received and/or one or more resolution actions have been taken based on the diagnostic information, the UAV may leave the location associated with the device.

Techniques described herein are particularly useful with devices that are part of a network, but are in very difficult places to manually reach. For example, a device may be a weather sensor located atop of a building or under a bridge and may be very difficult to reach by a human. The device could also be in a remote location (i.e., far from a service facility) which makes the device difficult to access or service. However, such locations may be easily accessible by a UAV. In such an example, diagnostic information associated with a device may also be easier to capture via a UAV than via a human. The devices could also be out of range of a high-bandwidth network, or have limited power capabilities (e.g., battery powered or solar powered) which would inhibit the device from operating on a high-bandwidth network. As discussed above, an NBIoT-based network is an example of a network that may have limited bandwidth. NBIoT networks, for example, may have a max data rate of around 250 Kilobytes per second (kbs). Such a speed may not be conducive to massive data transmission such as firmware updates, especially when bandwidth within the network is being utilized for other purposes (e.g., exchanging sensor data). Accordingly, to circumvent the low data rate, the UAV may provide a secondary communication path, via a short-range connection, to transmit larger data sets to one or more devices in a network. The secondary communication path may also utilize less power, which may be critical when the devices have a limited power supply. One or more additional advantages, based on the disclosure provided herein, may be realized.

FIG. 1 illustrates an embodiment of a computer network 100. Computer network 100 may include mobile device 102, backend system 104, one or more locations 106-112, one or more devices 114-124, network 126, network 128, and short-range connection 132. Mobile device 102 may be an unmanned aerial vehicle (UAV), such as a drone. Mobile device 102 may comprise a propulsion system, such as one or more propellers (e.g., standard propellers, pusher propellers, and the like), one or more motors (e.g., brushless motor, brushed motor, and the like), landing gear, one or more electronic speed controllers (ESC), a flight controller, one or more transceivers, a GPS module, one or more batteries, one or more short-range communicators, and/or one or more cameras. Mobile device 102 may be a fully autonomous UAV such that the UAV may autonomously fly and/or be piloted by a remote pilot to fly to a particular location based on location information such as GPS coordinates. Upon reaching a particular location, mobile device 102 may establish, via a short-range communicator, a connection with one or more of devices 114-124. The short-range communicator may be a system-on-a-chip (SoC), a magnetic cord, or other hardware device that enables short-range communication. The short range communicator may enable mobile device 102 to communicate via one or more protocols including, but is not limited to, Bluetooth, Bluetooth Low Energy, Near Field Communication (NFC), Infrared (IR), and Zigbee. In one embodiment, the short-range commutator may establish a physical short-range connection. In such an embodiment, the short-range communicator may be physical wire (e.g., a magnetic cord) that physically attaches mobile device 102 to a port on the one or more of devices 114-124.

Backend system 104 may include a backend processor 134 and a device database 130. Backend system 104 may provide data packets to mobile device 102 and, in some embodiments, determine one or more issues and resolution actions associated with one or more of devices 114-124. Backend processor 134 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Device database 130 may comprise one or more non-transitory processor-readable mediums, such as random access memory (RAM), flash memory, a hard drive disk (HDD), or a solid state drive (SSD). Device database 130 may store data associated with one or more of devices 114-124. For example, device database 130 may store a current firmware indicator, one or more firmware updates, device information (e.g., compatible protocols), location information (e.g., GPS coordinates), expected bitrate (e.g., a range of expected bitrate for a device), and the like. The data within device database 130 may be utilized to provide mobile device 102 with one or more firmware updates associated with one of devices 114-124 and a location associated with one of devices 114-124. Furthermore, the data within device database 130 may be utilized by backend processor 134 to determine one or more resolution actions based on received diagnostic data from mobile device 102.

Locations 106-112 may be geographic locations where one or more of devices 114-124 are physically located. Together, locations 106-112 may form a specific type of network, such as an NBIoT network. Locations 106-112 may be separated by any suitable distance such as, for example, one-hundred kilometers. As depicted, location 106 comprises device 114 and device 116, location 108 comprises device 118, location 110 comprises device 122 and device 120, and location 112 comprises device 124. Each device of devices 114-124 may be connected to each other via a network 128. Network 128 may be a Low Power Wide Area Network (LPWAN), a Low Power Wireless Personal Area Network (LPPAN), LTE Cat NB1 Network, LTE Cat NB2 Network, LoRa and the like. Because of the limited bandwidth of the network 128, the amount of data that can be transmitted directly to or from the backend system 104 may be limited.

Devices 114-124 may be sensors (e.g., gas, water, pollution, noise, weather sensors), controllers (e.g., light and heat controller), a security monitor (e.g., device capable of tracking a person, animal or asset), or any other system which collects data, and the like. While the computer network 100 is illustrated as having six devices 114-124, the computer network 100 may have any number of devices. The devices 114-124 may be identical throughout a computer network 100, or may have varied function depending upon the needs of the specific computer network 100. As discussed above, the devices 114-124 may not be connected to a fixed power source (e.g., a utility company providing power), depending upon whether a fixed power source is available at the desired installation location for the respective device. In one embodiment, for example, a device 114 may only include a battery and, thus, may have a fixed life cycle. In other embodiments, the device may have a battery and a power generation source, such as solar panels. In embodiments where a device 114-124 is not connected to a fixed power source, minimizing power consumption is desirable to extend the life of the device. Accordingly, by utilizing the mobile device 102 to provide certain data packages to the devices 114-124, the life cycle of the devices 114-124 may be improved by reducing the power required to update the respective devices relative to utilizing a high-bandwidth connection. Additionally, by providing a way to provide large data sets to a device, the system allows the devices to be designed without a high bandwidth communication system, reducing the cost of the device.

Mobile device 102 may communicate with one or more of devices 114-124 via a short-range connection 132. Short-range connection 132 may be implemented by one or more of the following protocols: Bluetooth®, Bluetooth Low Energy (BLE)®, WiFi®, Near Field Communication (NFC), Infrared (IR), Zigbee®, a physical wired connection, and the like. In one embodiment, one or more of devices 112-124 may be capable of only implementing specific short-range communication protocols. For example, device 124 may be Bluetooth compatible only, device 114 may be NFC and IR compatible, but not Zigbee compatible, and so forth. Mobile device 102 may be capable of utilizing multiple short-range connection protocols in order to connect to a variety of devices.

Mobile device 102 may communicate with backend system 104 via a network 126. Network 126 may be a 4G, 5G, or other broadband cellular network. Network 126 may provide faster throughput than network 128. Network 126 may also provide longer communication distance than short-range connection 132. In one embodiment, backend system 104 may transmit, via network 126, data to mobile device 102 that causes mobile device 102 to perform one or more functions described herein. For example, backend system 104 may transmit, via network 126, one or more firmware upgrades for one or more of devices 114-124. As another example, backend system 104 may transmit, via network 126, one or more data gathering instructions (e.g., taking a photograph) or resolution actions to mobile device 102.

Figure 2:
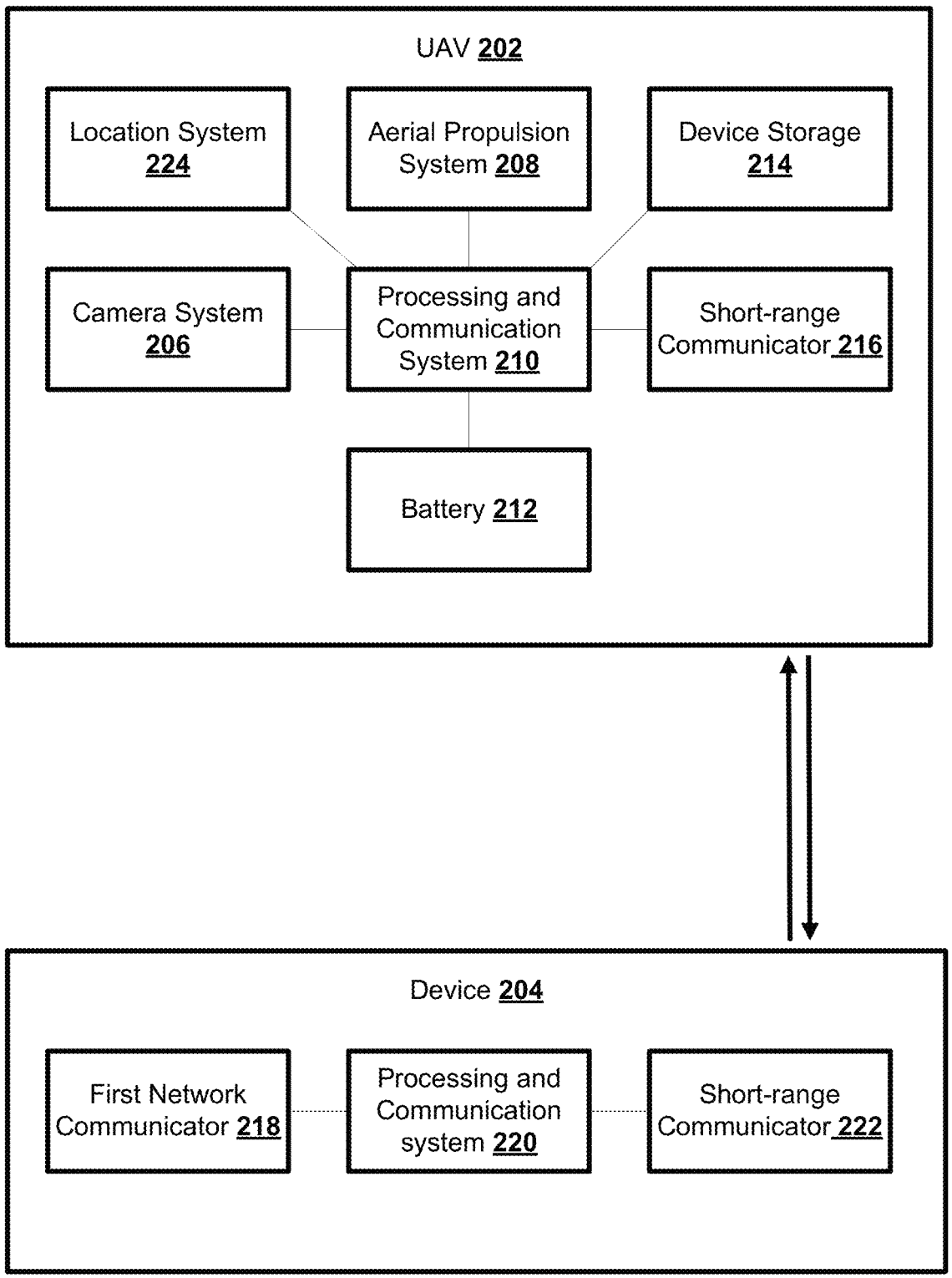
FIG. 2 illustrates an example UAV and device in accordance with one or more embodiments described herein.

FIG. 2 illustrates an embodiment of a block diagram of UAV 202 and device 204. UAV 202 is an example of a mobile device 102 illustrated in FIG. 1. Likewise, device 204 is an example of a device 114-124 illustrated in FIG. 1. UAV 202 comprises location system 224, camera system 206, aerial propulsion system 208, processing and communication system 210, battery 212, device storage 214, short-range communicator 216. Location system 224 may include a GPS system that may communicate with one or more satellites (or other network) to provide location information associated with UAV 202. Location information may be utilized by UAV 202 to determine its proximity to device 204. For example, UAV 202 may need to be within a certain physical range of device 204 in order to implement one or more short-range communication protocols. Location system 224 may be utilized for navigation subsequent to a take-off procedure of UAV 202.

Camera system 206 may include one or more cameras. For example, camera system 206 may include digital single-lens reflex camera (DSLR), an infrared camera, a depth camera, or any other still frame camera or video camera, or any combination thereof. These various camera types may be utilized to capture information about device 204. For example, a DSLR camera may be used to capture a picture of a solar panel associated with device 204 to determine, via image recognition, any potential damage to the solar panel. In another example, an infrared camera may be utilized to determine if one or more components inside device 204 has overheated.

Aerial propulsion system 208 may include devices that aid UAV 202 in flight. Aerial propulsion system 208 may include propellers (e.g., standard propellers, pusher propellers, and the like), one or more motors (e.g., brushless motor, brushed motor, and the like), landing gear, one or more electronic speed controllers (ESC), a flight controller, one or more transceivers, and the like.

Processing and communication system 210 may include one or more processors and one or more communication interfaces. The one or more processors may perform, via executing code stored in memory, one or more functions described herein. The one or more communication interfaces may be utilized to communicate via a wired or wireless connection to device 204 via short-range communicator 216. The one or more communication interfaces may also be utilized to communicate via a broadband cellular network with a backend system to receive data associated with device 204, such as a firmware update for device 204.

Battery 212 may provide power to one or more devices of UAV 202. For example, battery 212 may provide power to one or more components of aerial propulsion system 208 in order to propel UAV 202. Battery 212 may be rechargeable or non-rechargeable battery. In one embodiment battery 212 may be recharged via a wired or wireless connection.

Device storage 214 may store data associated with device 204. Device storage 214 may store data that has been previously received by UAV 202 and that is to be transmitted, via short-range communicator 216, to device 204. Data associated with device 204 may include, software updates, firmware updates, a self-diagnosis executable file, or one or more other executable instructions or software. In addition, data associated with device 204 may include one or more short-range communication protocols that are compatible with device 204. For example, device 204 may be WiFi compatible only. Using this information, UAV 202 may communicate with device 204 via a WiFi-based protocol.

Short-range communicator 216 may be a system-on-a-chip (SoC), a magnetic cord, or other hardware device that enables short-range communication to device 204. In one embodiment, upon UAV 202 being within a particular range of device 204, a magnetic cord may be presented to device 204. The magnetic cord may snap into one or more magnets located on device 204 in order to connect to a data port on device 204. One or more datasets may be transmitted, via the magnetic cord to the data port on device 204. The UAV 202 may utilize data from the camera system 206 to target the magnetic cord to establish the connection. One benefit of using the magnetic cord to establish the short range communication is that a physical connection typically utilizes less power, is more reliable and provides a higher throughput to transfer data than a wireless connection.

Device 204 comprises a first network communicator 218, processing and communication system 220, and short-range communicator 222. First network communicator 218 may be a system-on-a-chip (SoC) or other hardware device that enables communication between one or more devices. The first network communicator 218 may enable device 204 to communicate with one or more devices within the same network according to a first protocol. For example, the first network communicator may allow device 204 to communicate with other devices over a low bandwidth network, such as LPWAN or LPPAN.

Processing and communication system 220 may include one or more processors and one or more communication interfaces. The one or more processors may perform, via executing code stored in memory, one or more functions described herein. The one or more communication interfaces may be utilized to communicate via a wired or wireless connection to UAV 202 via short-range communicator 222. Short-range communicator 222 may be a system-on-a-chip (SoC), a magnetic cord, or other hardware device that enables short-range communication to UAV 202. The one or more communication interfaces may also be utilized to communicate via the first network communicator 218 with other devices in a network (e.g., other sensors in a sensor network) to receive and transmit data associated with device 204.

Figure 3:
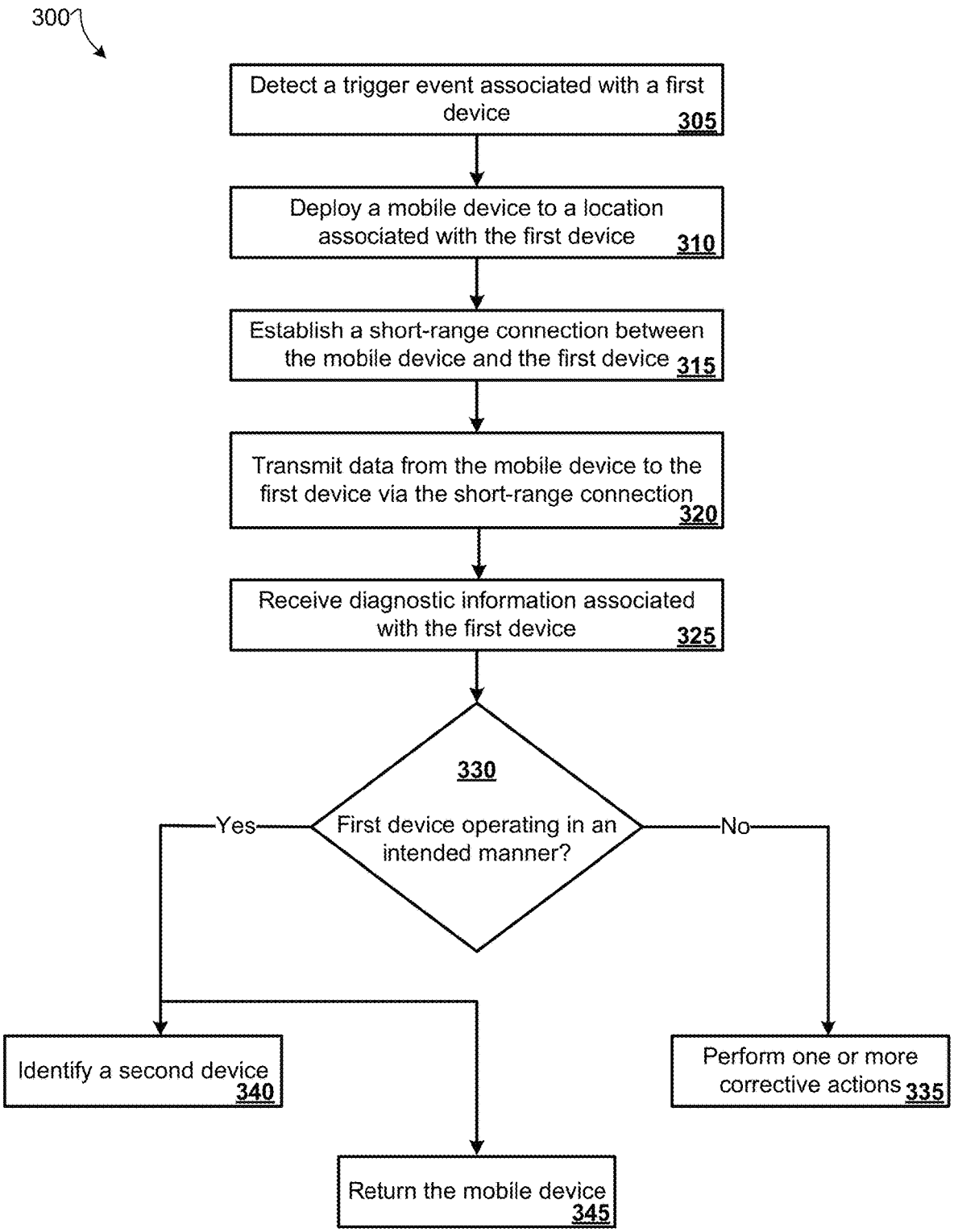
FIG. 3 depicts a first method in accordance with one more embodiments described herein.

FIG. 3 illustrates an embodiment of a process 300. Process 300 may be performed by one or more components of computer network 100. For example, one or more operations of process 300 may be performed by mobile device 102 and/or backend system 104 of FIG. 1. Process 300 may be a process for determining if a device is operating in an intended manner (e.g., if a device is operating according to a proper firmware or software version).

At block 305, a trigger event is detected that is associated with a first device. The first device may be one of a plurality of devices within a specific network. For example, the plurality of devices may be devices that are part of an NBIoT network. In such an example, the first device may be a sensor such as a weather sensor. The first device may periodically (e.g., every hour, every day, and the like) send status information to the backend system or may send the status information in response to a request from the backend system over a low bandwidth network. The status information may be, for example, data associated with the device (e.g., firmware version, power level, bandwidth data, and the like), a data request, or the like. Based upon this status information, the backend system may determine that a trigger event associated with the first device has occurred.

In one embodiment, for example, the trigger event may be based upon the bandwidth of the network. For example, the status information may indicate a current bitrate (e.g., 20 kbs). The backend system may query an associated device database to determine if the received current bitrate is within an acceptable range for the first device (e.g., between 100 kbs and 200 kbs) in order to transfer a data package over the low bandwidth network. In situations where the received current bitrate is below an acceptable range for the first device, the trigger event is detected.

In one embodiment, the trigger event may be detected according to a current firmware or software version installed on the first device. Status information may indicate a current firmware version of the first device. The backend system may query an associated device database to determine if there is a firmware update available (e.g., if the installed firmware is outdated) for the first device. In situations where there is a firmware update, the trigger event is detected.

In one embodiment, the trigger event may be detected according to not receiving a periodic signal from the first device. If status information is not received, based on a periodic schedule associated with the first device, the trigger event may be detected. For example, according to data within an associated device database, the first device is to send status information every 15 hours. In situations where, for example, 16 hours have passed without receiving status information, then the trigger event may be detected.

In some embodiments, the trigger event may be based on an error of the first device. When the error is detected, an indication of such may be transmitted to the backend system to determine that data needs to be provided to the device.

In one embodiment, the trigger event may be based upon the power level of the first device. When the power level of the first device is below a predetermined threshold, the backend system may determine that the battery drain caused by transferring a data package over the low bandwidth network may exceed a desirable amount, thereby causing the trigger event. Numerous other trigger events are possible and can vary from device to device based upon the device's respective capabilities and purpose.

At block 310, a mobile device is deployed to a location associated with the first device. The mobile device may be a UAV or another type of autonomic vehicle such as a self-driving car. The mobile device may receive, via one or more transceivers, GPS coordinates associated with the first device. The backend system may query an associated device database to retrieve GPS coordinates associated with the first device and transmit the GPS coordinates to the mobile device. Furthermore, the backend system may query the associated device database to retrieve firmware updates or other data to be uploaded, via the mobile device, to first device. The firmware update or other data may be transmitted to the mobile device prior to the mobile device deploying or while the mobile device is in route to the first device. In situations where the firmware update or other data is transmitted to the mobile device prior to the mobile device being deployed, such a transmission may happen via a wired or hardware interface (e.g., Universal Serial Bus (USB) interface, Thunderbolt®, Firewire®, etc.). In situations where the firmware update or other data is transmitted to the mobile device while the mobile device is in route to the first device, such a transmission may happen via a broadband cellular wireless connection (e.g., 4G, 5G, and the like).

At block 315, once the mobile device arrives at the location associated with the first device, the mobile device establishes a short-range connection with the first device. The short-range connection may utilize one or more protocols that are compatible with the first device. For example, the first device may be Bluetooth compatible and the short-range connection between the first device and the mobile device can be a Bluetooth connection. In one embodiment, the mobile device may present some type of authentication code to the first device, such that the first device may recognize the mobile device as a device that is authorized to establish a short-range connection. For example, the mobile device may transmit a password to the first device. In response to receiving a valid password, the first device may initiate its Bluetooth for pairing.

At block 320, the mobile device transmits data, via the short-range connection, to the first device. The transmitted data may be a firmware update or other large data sets such as calibration data, training data, machine learning algorithms, and the like. Other data may be data that when executed by the first device performs one or more functions. For example, other data, when executed by the first device may automatically restart the first device. In another example, other data, when executed by the first device may initiate one or more self-diagnosis tests.

At block 325, the mobile device receives diagnostic information associated with the first device. In response to transmitting the data from the mobile device to the first device, the first device sends a response. The response may indicate that the first device has successfully received and applied the data or that the first device has not successfully received or applied the data. In any instance, the mobile device may collect diagnostic information from the first device. For example, after data has been attempted to be transferred to the first device, the first device may run a self-diagnosis test and transmit the results via the short-range connection to the mobile device. In one embodiment, the first device may transmit status information to the mobile device. It should be noted that diagnostic information may include other information (e.g., status information and data associated with a bandwidth test) besides results from a self-diagnosis test.

At block 330, the mobile device determines if the first device is operating in an intended manner. The determination may be based on diagnostic information acquired by the mobile device. For example, the self-diagnosis results or status information received from the first device may indicate a current firmware version currently operating on the first device. If the current firmware version matches the firmware version that was transmitted to the first device, then the mobile device may confirm that the firmware was successfully received and applied and that the first device is operating in an intended manner. Conversely, if the self-diagnosis results or status information indicates that a current firmware version operating on the first device does not correspond to the version of the firmware that was transmitted, then the mobile device may determine that the first device is not operating in an intended manner. In one embodiment, after transmitting data to the first device, the mobile device may query the memory of the first device to determine if the transmitted data is located in a proper place in memory (e.g., a retrieve diagnostic information). Such an embodiment is useful when the effects of the data transmission may not be instantly apparent in the operation of the first device. For example, the transmitted data may change the timing of the transmission of status information to the backend system. In another example, the transmitted data may modify the power consumption of the first device. In such examples, it may not be readily apparent, based on the actions of the first device, if the transmitted data has had its desired effect.

In one embodiment, the backend system may make the determination as to whether the first device is operating in an intended manner. Self-diagnosis results or status information may be first received by the mobile device, then forwarded from the mobile device to the backend system. The backend system may then determine if the first device is operating in an intended manner. For example, the received self-diagnosis results or status information may indicate a bitrate associated with the first device. The backend system may compare the received bitrate with an expected bitrate range for the first device. If the received bitrate is within the expected bitrate range, then the first device may be operating in an intended manner. However, if the received bitrate is not within the expected bitrate range, then the first device may not be operating in an intended manner. In one embodiment, the determination as to whether the first device is operating in an intended manner may be based on the trigger detected at 205. For example, if the trigger detected at 205 is associated with the bitrate of the first device, then the determination of whether the first device is operating in an intended manner may be based on the bitrate of the first device. In another example, if the trigger detected at 205 is associated with outdated firmware on the first device, then the determination of whether the first device is operating in an intended manner may be based on the firmware version of the first device.

If at block 330 the first sensor is not performing in an intended manner, then process 300 moves to block 335. At 335, the mobile device may perform one or more corrective actions. The mobile device may perform one or more data gathering processes in order to determine what resolution actions can be performed to configure the first device to operate in an intended manner. These processes are further described in FIG. 4.

If at block 330 the first sensor is operating in an intended manner, then process 300 moves to block 340. At block 340, the mobile device identifies a second device. Prior to the mobile device being deployed, a plurality of triggers may be determined for a plurality of devices. The mobile device may receive, via one or more transceivers, GPS coordinates associated with the second device. The mobile device may also receive a firmware update or other data to be transmitted to the second device. In one embodiment, the mobile device may carry GPS coordinates and data associated with a plurality of devices such that the mobile device may sequentially connect to different devices. In such an embodiment, the data to be transmitted to the different devices may be different and the short-range connection protocol utilized to transmit data to the different devices may be different. For example, the mobile device may deploy first to a first location and transmit first data to a first device via a first short-range protocol. Next, the mobile device may travel to a second location and transmit second data to a second device via a second short-range protocol. The first and second devices may be different devices, but the first and second devices may be part of the same network. For example, the first device may be a weather sensor of an NBIoT network and the second device may be a controller within the same NBIoT network. The first and second location may be different locations. For example, the first location may be located miles apart from the second location. The first data may be different from the second data. For example, the first data may be a firmware update that is particular to the first device type (e.g., weather sensor) and the second data may be a firmware update that is particular to the second device type (e.g., controller). The first short-ranged protocol may be different from the second short-ranged protocol. For example, the first short-ranged protocol may be NFC and the second short-ranged protocol may be Bluetooth Low Energy.

Operations associated with blocks 305-340 may be also performed for a second device. By enabling the mobile device to service multiple devices, efficiency for remote device updates is achieved. For example, prior to being deployed the mobile device may receive, via a hardwired connection (e.g., USB3.0), firmware updates for a plurality of devices. The mobile device may then sequentially travel to locations associated with each of the plurality of devices and transmit, via a corresponding short-range protocol, corresponding firmware updates.

Once the mobile device has provided data to the second device and any other additional devices, at block 345 the mobile device returns to a docking station. The docking station may be located at a location associated with the backend system. The docking station may provide one or more charging services to the mobile device.

Figure 4:
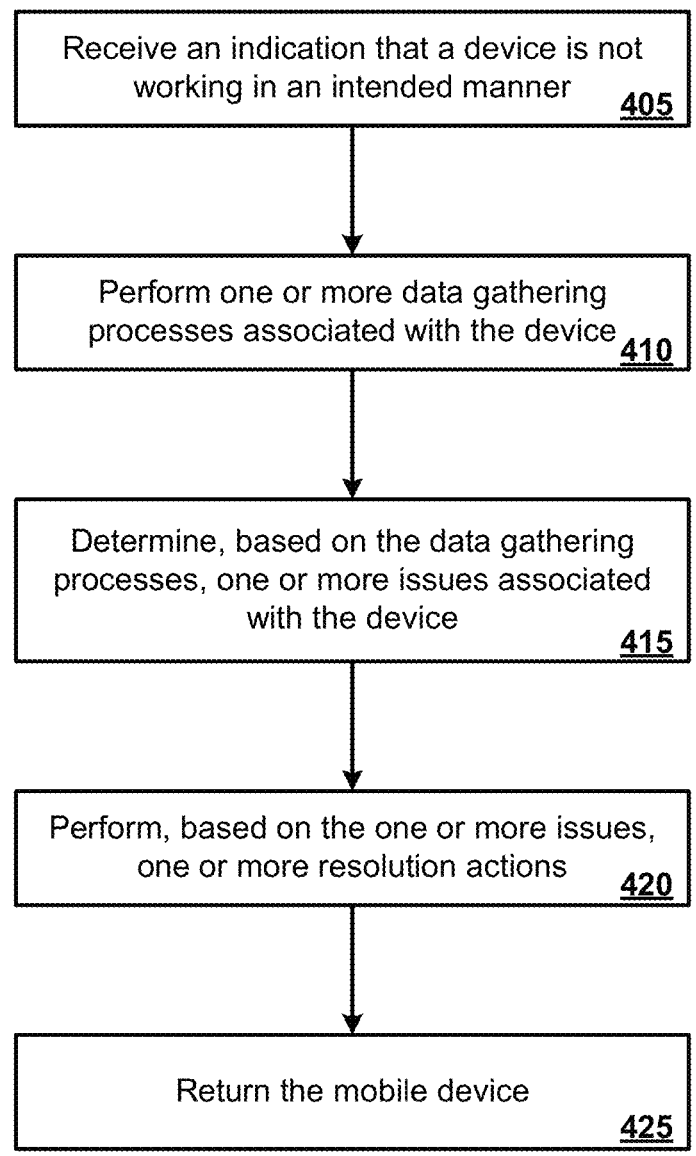
FIG. 4 depicts a first method in accordance with one or more embodiments described herein.

FIG. 4 illustrates an embodiment of a process 400. Process 400 may be performed by one or more components of computer network 100. For example, one or more operations of process 400 may be performed by mobile device 102 and/or backend system 104 of FIG. 1. Process 400 may be a process for determining one or more corrective actions if a device is not operating in an intended manner (e.g., if a bitrate associated with a device is below a threshold).

At block 405, a backend system receives an indication that a device is not working in an intended manner. The backend system may receive diagnostic information or status information associated with the device (e.g., from the device itself or via a mobile device). The backend system may then compare the received data with previously stored data associated with the device to determine if the device is operating properly. For example, the received status information may indicate a first firmware version that the device is currently running. The backend system may compare the first firmware version with data that indicates the most current firmware version for the device. If the first firmware version and the most current firmware version do not match, then it may be determined that the device is not working in an intended manner.

At block 410, the backend system transmits instructions to the mobile device, that when executed by the mobile device causes the mobile device to perform one or more data gathering processes associated with the device. The transmitted instructions may be particular to the reason why the device is not working in an intended manner. For example, if the reason for the device not working in an intended manner is that a bitrate associated with the device is below a certain threshold, the instructions may cause the mobile device to attempt to transmit data packets to the device via a first connection type (e.g., NBIoT network). The mobile device may monitor the data transmission rate and transmit the results to the backend system. In such an example, the bitrate associated with a device may be low, but after the data gathering process it may be determined that hardware within the device is properly operating. This may indicate there is another bottleneck somewhere else in the network and the cause of the device's low bitrate is not the fault of the device itself. Other data gathering processes may be performed by the mobile device, such as, taking photos of one or more components of the device to determine physical damage of the device, thermal imaging of one or more components of the device to determine if one or more components have overheated, speed tests to determine upload and download speed associated with the device, memory analysis to determine if the memory of the device is full (e.g., device unable to receive data because its memory is at capacity), battery analysis to determine if the device is operating in a proper mode (e.g., battery is almost empty so device may have reduced functionality), and the like.

At block 415, the backend system determines, based on the data gathering process(es), one or more issues associated with the device. For example, based on images gathered by the mobile device, the backend system may determine, via image analysis, that a solar panel associated with the device has been cracked. In such an example, the issue with the device may be a damaged solar panel. In another example, based on a memory analysis, the backend system may determine that a device cannot receive a firmware update because the device does not have the storage capacity. In such an example, the issue with the device may be lack of memory. In another example, based on a speed test, the backend system may determine that a device's bitrate is low because there exists some external issue. In such an example, instructions may be sent to the mobile device, that when executed by the mobile device, cause the mobile device to perform speed tests on a variety of devices within the network to determine a location of the bottleneck in the network. Other issues with a device or a network associated with the device may be determined based on data gathered at 410.

At block 420, the backend system determines, based on the one or more issues, one or more resolution actions. A resolution action may be based on the determined issue. For example, if the backend system determines that a solar panel associated with the device is damaged, the resolution action may be to replace the solar panel. In such an example, the mobile device may be utilized to autonomously replace the solar panel. Alternatively, the backend system may generate a maintenance ticket which indicates to a human that the human should physically replace the solar panel. In another example, if the backend system determines that the device does not have the memory capacity to receive a firmware update, the resolution action may be to delete data within the device or upgrade the memory of the device. In such an example, the mobile device, while connected to the device via a short-range communication protocol, may edit data within the device's memory. Alternatively, the mobile device may duplicate one or more datasets within the device's memory, transmit those datasets to a cloud storage device, and subsequently delete the one or more datasets from the device's memory. Other resolution actions may be taken based on one or more issues associated with the device.

Once the mobile device has performed one or more resolution actions (if the mobile device is instructed to perform one or more resolution actions), at 325 the mobile device returns to a docking station. The docking station may be located at a location associated with the backend system. The docking station may provide one or more charging services to the mobile device.

Figure 5:
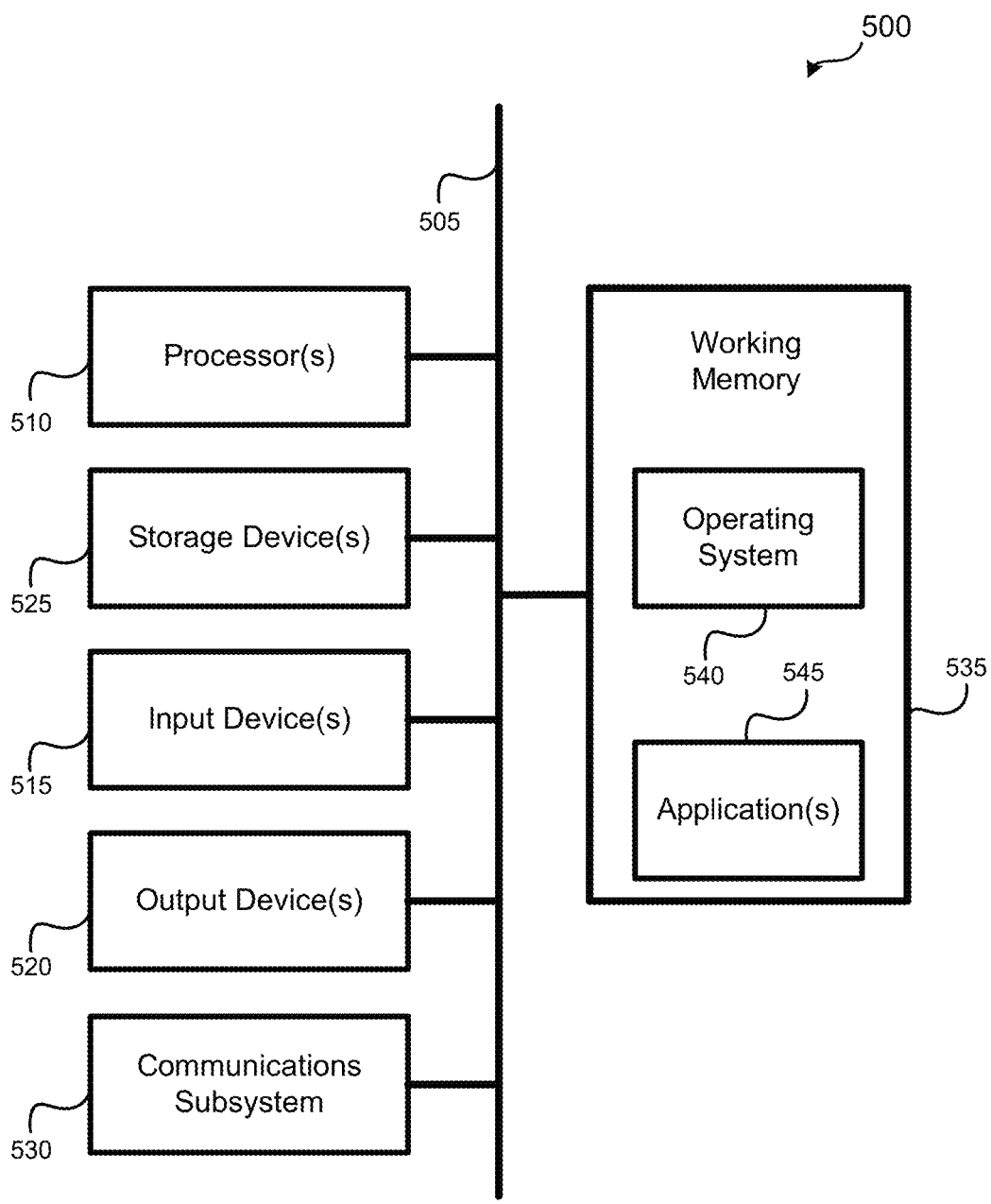
FIG. 5 illustrates an example computer system in accordance with one or more embodiments described herein.

FIG. 5 illustrates an embodiment of a computer system that may be incorporated as part of the UAV and/or UAV docking system. A computer system as illustrated in FIG. 5 may be incorporated as part of the previously described computerized devices, such as mobile device 102, and/or backend system 104. FIG. 5 provides a schematic illustration of one embodiment of a computer system 500 that can perform various steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication). The hardware elements may include one or more processors 510, including without limitation one or more general-purpose processors and/or one or more special-purpose processors (such as digital signal processing chips, graphics acceleration processors, video decoders, and/or the like); one or more input devices 515, which can include without limitation a mouse, a touchscreen, keyboard, remote control, and/or the like; and one or more output devices 520, which can include without limitation a display device, a printer, etc.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 might cause the processor(s) 510 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for communicating with a device utilizing an unmanned aerial vehicle (UAV), comprising:
   detecting a triggering event associated with the device;
   transmitting, to the UAV, a data set and a location associated with the device;
   deploying the UAV to the received location in response to the triggering event;

establishing, by the UAV, a second connection with the device at the received location;

transmitting, by the UAV, the data set to the device at the received location; and receiving, by the UAV, at the received location, status information associated with the device from the device via the second connection after the data set is transmitted to the device.

2. The method of claim 1, wherein the first triggering event comprises of a bandwidth associated with the device falling below a predetermined threshold.

3. The method of claim 1, wherein the status information comprises diagnostic information.

4. The method of claim 3, wherein receiving the diagnostic information comprises:

capturing, via an imaging device on the UAV, an image the device; and transmitting, by the UAV, the image of the device to a backend system.

5. The method of claim 1, wherein the first triggering event comprises a firmware version of the device being out of date.

6. The method of claim 5, further comprising:

accessing a device database that maintains an indication of a current firmware version of a plurality of devices, the plurality of devices comprising the device, wherein information within the device database indicates the firmware version of the device is out of date.

7. The method of claim 1, wherein detecting the first triggering event is performed by a backend server system.

8. A system for updating a device, the system comprising:

a backend system that is in communication with an unmanned aerial vehicle (UAV), the backend system configured to:

detect a first triggering event associated with the device; and transmit, to the UAV, a location of the device; and the UAV, configured to:

receive a location of the device from the backend system;

deploy to the location in response to the first triggering event associated with the device;

establish a connection with the device at the location; and transmit data to the device via the connection at the location.

9. The system for updating the device of claim 8, wherein the UAV is further configured to receive status information associated with the device from the device via the connection.

10. The system for updating the device of claim 8, wherein the backend system is further configured to transmit the data to the UAV.

11. The system for updating the device of claim 8, wherein a first connection is used to transmit the location of the device from the backend system to the UAV and a second connection that differs from the first connection is used to communicate between the device and the UAV.

12. The system for updating the device of claim 8, wherein the first triggering event comprised of a bandwidth associated with the device falling below a predetermined threshold.

13. The system for updating the device of claim 8, wherein the backend system is further configured to receive diagnostic information provided by the device.

14. The system for updating the device of claim 8, wherein the UAV is further configured to:

capture, using an imaging device of the UAV, an image of the device; and transmit the image of the device to the backend system.

15. The system for updating the device of claim 11, wherein the UAV configured to:

cause the device to perform a self-diagnosis to generate a first result; and transmit, to the backend system, the first result via a third connection, wherein the third connection is different from the first connection and the second connection.

16. A non-transitory processor-readable medium, comprising processor-readable instructions configured to cause one or more processors of an unmanned aerial vehicle (UAV) to:

receive, via a first connection, a data set and a location associated with a device;

deploy to the received location in response to a triggering event;

establish a second connection with the device at the received location; and transmit the first data set to the device at the received location.

17. The non-transitory processor-readable medium of claim 16, wherein the processor-readable instructions are further configured to cause the one or more processors of the UAV to:

receive status information from the device via the second connection.

18. The non-transitory processor-readable medium of claim 16, wherein the triggering event comprises of a bandwidth associated with the device falling below a predetermined threshold associated with the first connection.

19. The non-transitory processor-readable medium of claim 16, wherein the triggering event comprises a firmware version of the device being out of date.

20. The non-transitory processor-readable medium of claim 16, wherein the processor-readable instructions are further configured to cause the one or more processors of the UAV to:

cause an image of the device to be captured using an imaging device of the UAV; and transmit the image of the device to a backend system.

* * * * *